US006610752B1

(12) United States Patent
Schmid et al.

(10) Patent No.: US 6,610,752 B1
(45) Date of Patent: Aug. 26, 2003

(54) DEFOAMER GRANULES AND PROCESSES FOR PRODUCING THE SAME

(75) Inventors: Karl Heinz Schmid, Mettmann (DE); Michael Neuss, Koeln (DE); Detlef Stanislowski, Memann (DE); Karin Koren, Duesseldorf (DE); Andrea Borntraeger, Haan (DE)

(73) Assignee: Cognis Deutschland GmbH, Duesseldorf (DE)

(*) Notice: Subject to any disclaimer, the term of this patent is extended or adjusted under 35 U.S.C. 154(b) by 67 days.

(21) Appl. No.: 09/685,117

(22) Filed: Oct. 10, 2000

Related U.S. Application Data

(60) Provisional application No. 60/162,639, filed on Nov. 1, 1999.

(30) Foreign Application Priority Data

Oct. 9, 1999 (EP) ........................................... 99120217

(51) Int. Cl.$^7$ .......................... B01D 19/04; C11D 17/06

(52) U.S. Cl. ....................... 516/117; 510/226; 510/313; 510/315; 510/316; 510/317; 510/442; 510/446; 516/120; 516/123

(58) Field of Search ................................ 516/117, 123; 510/442, 446

(56) References Cited

U.S. PATENT DOCUMENTS

| | | | | | |
|---|---|---|---|---|---|
| 3,933,672 | A | * | 1/1976 | Bartolotta et al. | |
| 3,966,629 | A | | 6/1976 | Drumbrell | |
| 3,997,459 | A | * | 12/1976 | Bogie et al. | |
| 4,419,260 | A | | 12/1983 | Reuter et al. | |
| 4,451,387 | A | * | 5/1984 | Tai | 516/117 X |
| 4,062,647 | A | | 2/1985 | Storm et al. | 8/137 |
| 4,524,009 | A | | 6/1985 | Valenty | |
| 4,639,325 | A | | 1/1987 | Valenty et al. | |
| 4,737,306 | A | | 4/1988 | Wichelhaus et al. | |
| 4,816,553 | A | | 3/1989 | Baur et al. | 528/245 |
| 4,818,292 | A | * | 4/1989 | Iley et al. | 516/120 X |
| 4,820,439 | A | | 4/1989 | Rieck | |
| 4,894,177 | A | * | 1/1990 | Starch | 516/117 X |
| 4,985,553 | A | | 1/1991 | Fuertes et al. | |
| 5,002,695 | A | | 3/1991 | Schulz et al. | |
| 5,073,298 | A | * | 12/1991 | Gentle et al. | 516/117 |
| 5,238,596 | A | * | 8/1993 | Smith | |
| 5,318,718 | A | * | 6/1994 | Seiter et al. | 516/117 |
| 5,318,733 | A | | 6/1994 | Carduck et al. | 264/15 |
| 5,356,607 | A | | 10/1994 | Just | 423/334 |
| 5,374,716 | A | | 12/1994 | Biermann et al. | 536/18.6 |
| 5,431,780 | A | | 7/1995 | Raehse et al. | 159/48.1 |
| 5,494,488 | A | | 2/1996 | Arnoldi et al. | 8/137 |
| 5,501,814 | A | | 3/1996 | Engelskirchen et al. | |
| 5,516,447 | A | * | 5/1996 | Bauer et al. | |
| 5,536,430 | A | | 7/1996 | Fues et al. | 510/535 |
| 5,540,856 | A | * | 7/1996 | Wevers et al. | 516/120 X |
| 5,541,316 | A | | 7/1996 | Engelskirchen et al. | 510/471 |
| 5,544,427 | A | | 8/1996 | Raehse et al. | 34/372 |
| 5,576,425 | A | | 11/1996 | Hill et al. | 536/18.6 |
| 5,580,941 | A | | 12/1996 | Krause et al. | 527/300 |
| 5,637,560 | A | | 6/1997 | Raehse et al. | 510/443 |
| 5,668,101 | A | * | 9/1997 | Kolaitis et al. | 516/120 X |
| 5,780,420 | A | | 7/1998 | Breuer et al. | 510/466 |
| 5,783,616 | A | | 7/1998 | Krause et al. | 524/58 |
| 5,830,956 | A | | 11/1998 | Stockhausen et al. | 526/318.2 |
| 5,847,065 | A | | 12/1998 | Krause et al. | 527/300 |
| 5,854,191 | A | | 12/1998 | Krause et al. | 510/276 |
| 5,854,321 | A | | 12/1998 | Krause et al. | 524/58 |
| 6,075,001 | A | | 6/2000 | Wilde | 510/376 |
| 6,165,968 | A | * | 12/2000 | Lenoble | 516/117 X |

FOREIGN PATENT DOCUMENTS

| | | |
|---|---|---|
| CA | 981141 | 1/1976 |
| CA | 2158714 | 9/1995 |
| DE | 195 29 905 | 4/1971 |
| DE | 2334899 | 12/1974 |
| DE | 31 28 631 | 2/1983 |
| DE | 3526405 | 7/1985 |
| DE | 196 16 767 | 11/1986 |
| DE | 38 16 842 | 11/1989 |
| DE | 40 30 688 | 4/1992 |
| DE | 42 04 035 | 8/1993 |
| DE | 42 04 090 | 8/1993 |
| DE | 42 06 050 | 9/1993 |
| DE | 42 06 495 | 9/1993 |
| DE | 42 06 521 | 9/1993 |
| DE | 42 08 773 | 9/1993 |
| DE | 42 09 432 | 9/1993 |
| DE | 42 21 381 | 2/1994 |
| DE | 42 34 376 | 4/1994 |
| DE | 43 00 772 | 7/1994 |
| DE | 43 03 320 | 8/1994 |
| DE | 0 603 207 | 5/1995 |
| DE | A 4400024 | 7/1995 |
| DE | 44 16 438 | 11/1995 |
| DE | 44 17 734 | 11/1995 |
| DE | 44 43 177 | 6/1996 |
| DE | 195 24 287 | 1/1997 |
| DE | 196 20 411 | 2/1997 |
| DE | 195 36 082 | 4/1997 |
| DE | 195 47 457 | 6/1997 |
| DE | 196 00 018 | 7/1997 |

(List continued on next page.)

OTHER PUBLICATIONS

Falbe, et al., Römpp Chemie Lexikon, 9th Edition, vol. 6, p. 4440.

Mackenzie, et al., "Differential Thermal Analysis", The Analyst, 87, (1962), pp. 420–434.

*Primary Examiner*—Richard D. Lovering
(74) *Attorney, Agent, or Firm*—John E. Drach; Aaron R. Ettelman

(57) ABSTRACT

Defoamer granules containing support materials and silicones for solid laundry detergent, dishwashing detergent and cleaning compositions, obtainable by applying silicones in the form of aqueous emulsions to an added intermediate product of support materials and simultaneously drying and granulating the products in a fluidized bed, with the proviso that at least 85% by weight of the particles have a mean diameter below 1.5 mm, are described.

24 Claims, No Drawings

FOREIGN PATENT DOCUMENTS

| | | |
|---|---|---|
| DE | 196 05 688 | 8/1997 |
| DE | 196 13 103 | 10/1997 |
| DE | 196 16 693 | 11/1997 |
| DE | 196 16 769 | 11/1997 |
| DE | 196 16 770 | 11/1997 |
| DE | 196 20 267 | 11/1997 |
| DE | 19709991 | 9/1998 |
| DE | 19710254 | 9/1998 |
| EP | 0026529 | 9/1980 |
| EP | 0028432 | 10/1980 |
| EP | 0 150 930 | 1/1985 |
| EP | 0 164 514 | 12/1985 |
| EP | 0 232 202 | 1/1987 |
| EP | 0 272 030 | 12/1987 |
| EP | 0 280 223 | 8/1988 |
| EP | 0 309 931 | 4/1989 |
| EP | 0 392 592 | 4/1990 |
| EP | 0 427 349 | 11/1990 |
| EP | 0 443 651 | 2/1991 |
| EP | 0 446 982 | 2/1991 |
| EP | 0 453 003 | 2/1991 |
| EP | 0 458 397 | 5/1991 |
| EP | 0 458 398 | 5/1991 |
| EP | 0 525 239 | 7/1991 |
| EP | 0 472 042 | 8/1991 |
| EP | 0 542 496 | 11/1992 |
| EP | 0 544 490 | 11/1992 |
| EP | 0 549 271 | 12/1992 |
| EP | 0 549 272 | 12/1992 |
| EP | 0 496 510 | 3/1994 |
| EP | 0 486 592 | 6/1994 |
| EP | 0 693 550 | 12/1995 |
| EP | 0 544 519 | 1/1997 |
| EP | 0 301 298 | 1/2000 |
| GB | 94 19 091 | 9/1994 |
| JP | 93/339896 | 12/1993 |
| WO | WO 90/03977 | 4/1990 |
| WO | WO 91/08171 | 6/1991 |
| WO | WO 92/18542 | 10/1992 |
| WO | WO 93/02176 | 2/1993 |
| WO | WO 93/08251 | 4/1993 |
| WO | WO 93/16110 | 8/1993 |
| WO | WO 94/28103 | 12/1993 |
| WO | WO 94/09111 | 4/1994 |
| WO | WO 94/27970 | 12/1994 |
| WO | WO 94/28030 | 12/1994 |
| WO | WO 94/28102 | 12/1994 |
| WO | WO 95/00626 | 1/1995 |
| WO | WO 95/07303 | 3/1995 |
| WO | WO 95/12619 | 5/1995 |
| WO | WO 95/14075 | 5/1995 |
| WO | WO 95/14759 | 6/1995 |
| WO | WO 95/17498 | 6/1995 |
| WO | WO 95/20029 | 7/1995 |
| WO | WO 95/20608 | 8/1995 |
| WO | WO 95/27775 | 10/1995 |
| WO | WO 98/12299 | 3/1998 |
| WO | WO 98/40462 | 9/1998 |
| WO | WO 98/40463 | 9/1998 |
| WO | WO 98/55583 | 12/1998 |
| WO | WO 98/55590 | 12/1998 |

* cited by examiner

DEFOAMER GRANULES AND PROCESSES FOR PRODUCING THE SAME

CROSS-REFERENCE TO RELATED APPLICATIONS

This application claims priority, under 35 U.S.C. §119(e), of U.S. Provisional Patent Application No. 60/162,639, filed on November 1, 1999, the entire contents of which are hereby incorporated by reference.

BACKGROUND OF THE INVENTION

Detergents for domestic laundry and for industrial laundry, but also dishwashing detergents and cleaners, generally contain organic surfactants, builders and numerous organic and inorganic additives. The surfactants used for washing normally tend to foam in use which has an adverse effect on the cleaning result. Accordingly, there is a practical need to control foaming in use. Silicones have proven to be particularly suitable defoamers. They are generally applied to support materials and are optionally coated with other organic defoaming substances for use in solid laundry detergents, dishwashing detergents and cleaners.

Thus, the production of foam-suppressed detergents containing microencapsulated silicone defoamers is known from DE 3128631 A1. According to this document, the silicone is dispersed in an aqueous dispersion of a film-forming polymer and the dispersion is delivered to the spray-drying tower through a separate pipe, i.e. separately from the other detergent ingredients dissolved or dispersed in water. The two streams are then combined in the vicinity of the spray nozzle. Suitable film-forming polymers are, for example, cellulose ethers, starch ethers and synthetic water-soluble polymers. Microcapsules are spontaneously formed in the spray nozzle. The described process is limited in its application to the production of spray-dried detergents and does not appear to lend itself to detergents produced by other methods, for example by granulation. European patent application EP 0496510 A1 describes silicone-containing defoamers which are characterized in that a mixture of silicones and fatty alcohols, fatty acids or glycerol monoesters having special melting points is applied to starch as the support material. To produce these defoamer granules, the silicones and the other organic ingredients are mixed with the starch in liquid form or granulated by the fluidized bed process. A problematical aspect of this process is the spraying of the silicones and the organic materials onto the support during the granulation process. Thus, in view of their viscosity and their tacky, oily consistency, the silicones on the one hand are difficult to pump and, on the other hand, lead to stringing and tacky deposits in the spray nozzle, so that the fine spraying required is virtually impossible.

Accordingly, the problem addressed by the present invention was to provide new defoamer granules for solid laundry detergent, dishwashing detergent and cleaning compositions which would be distinguished in particular by their flowability and by the absence of dust emissions. Finally, the associated production process would be designed in such a way that the silicones would be easy to pump and could be finely sprayed on.

BRIEF SUMMARY OF THE INVENTION

This invention relates generally to solid laundry detergent, dishwashing detergent and cleaning compositions and, more particularly, to new silicone-containing defoamer granules for solid laundry detergent, dishwashing detergent and cleaning compositions which are obtained by simultaneous granulation and drying, to a process for their production and to the use of the granules for the production of solid surface-active compositions.

The present invention includes defoamer granules containing support materials and silicones for solid laundry detergent, dishwashing detergent and cleaning compositions which can be obtained by applying silicones in the form of aqueous emulsions to an added intermediate product of support materials and simultaneously drying and granulating the products in a fluidized bed, with the proviso that at least 85% by weight, preferably at least 90% by weight and more preferably at least 95% by weight of the particles have a mean diameter below 1.5 mm, preferably below 1.3 mm and more preferably between 0.1 and 1.5 mm.

It has surprisingly been found that the new defoamer granules fully satisfy the desired requirement profile.

The present invention also includes a process for the production of defoamer granules containing support materials and silicones for solid laundry detergent, dishwashing detergent and cleaning compositions, characterized in that silicones are applied in the form of aqueous emulsions to an added intermediate product of support materials and the products are simultaneously dried and granulated in a fluidized bed, with the proviso that at least 85% by weight, preferably at least 90% by weight and more preferably at least 95% by weight of the particles have a mean diameter below 1.5 mm, preferably below 1.3 mm and more preferably between 0.1 and 1.5 mm.

DETAILED DESCRIPTION OF THE INVENTION

Suitable silicones in the context of the present invention are typical organopolysiloxanes containing fine-particle silica which, in turn, may even be silanized. Corresponding organopolysiloxanes are described, for example, in U.S. Pat. No. 5,238,596, the entire contents of which are incorporated herein by reference. Polydiorganosiloxanes known from the prior art are particularly preferred. Suitable polydiorganosiloxanes have an almost linear chain and a degree of oligomerization of 40 to 1500. Examples of suitable substituents are methyl, ethyl, propyl, isobutyl, tert.butyl and phenyl. The polydiorganosiloxanes generally contain fine-particle silica which may even be silanized. Silica-containing dimethyl polysiloxanes are particularly suitable for the purposes of the present invention. The polydiorganosiloxanes advantageously have a Brookfield viscosity at 25° C. (spindle 1,10 r.p.m.) of 5000 mPas to 30,000 mPas and, more particularly, 15,000 mPas to 25,000 mPas. A key criterion of the present invention is that the silicones are sprayed in as aqueous emulsions. In general, the silicone is added with stirring to water. If desired, so-called thickeners known from the prior art may be added to increase the viscosity of the aqueous silicone emulsions. The thickeners may be inorganic and/or organic, particularly preferred thickeners being nonionic cellulose ethers, such as methyl cellulose, ethyl cellulose and mixed ethers, such as methyl hydroxyethyl cellulose, methyl hydroxypropyl cellulose, methyl hydroxybutyl cellulose, and anionic carboxy cellulose types, such as carboxymethyl cellulose sodium salt (abbreviation: CMC). Particularly suitable thickeners are mixtures of CMC with nonionic cellulose ethers in a ratio by weight of 80:20 to 40:60 and, more particularly, 75:25 to 60:40. In general and particularly where the described thickener mixtures are added, it is advisable to use concentrations of around 0.5 to 10% by weight and, more particularly, 2.0 to 6% by weight, expressed as thickener mixture and based on aqueous silicone emulsion. The content of silicones of the described type in the aqueous emulsions is advantageously in the range from 5 to 50% by weight and, more particularly, in the range from 20 to 40% by weight, expressed as silicones and based on aqueous silicone emulsion. In another advantageous embodiment, the aqueous silicone solutions contain starch-from natural sources, for example rice, potatoes, corn and wheat, as thickener. The starch is advantageously present in quantities of 0.1 to 50% by weight, based on silicone emulsion, and more particularly in the form of a mixture with the above-described thickener mixtures of sodium carboxymethyl cellulose and a nonionic cellulose ether in the quantities already mentioned. The aqueous silicone emulsions are preferably prepared by allowing any thickeners present to preswell in water before the silicones are added. The silicones are preferably incorporated using effective stirrers and mixers.

Suitable support materials in the context of the present invention are any known inorganic and/or organic support materials. Examples of typical inorganic support materials are alkali metal carbonates, aluminosilicates, water-soluble layered silicates, alkali metal silicates, alkali metal sulfates, for example sodium sulfate, and alkali metal phosphates. The alkali metal silicates are preferably a compound with a molar ratio of alkali metal oxide to $SiO_2$ of 1:1.5 to 1:3.5. The use of silicates such as these results in particularly good particle properties, more particularly high abrasion resistance and at the same time a high dissolving rate in water. Aluminosilicates as a support material include, in particular, the zeolites, for example zeolite NaA and NaX. The compounds described as water-soluble layered silicates include, for example, amorphous or crystalline waterglass. Suitable organic carrier materials are, for example, film-forming polymers, for example polyvinyl alcohols, polyvinyl pyrrolidones, poly(meth)acrylates, polycarboxylates, cellulose derivatives and starch. Suitable cellulose ethers are, in particular, alkali metal carboxymethyl cellulose, methyl cellulose, ethyl cellulose, hydroxyethyl cellulose and so-called cellulose mixed ethers, for example methyl hydroxyethyl cellulose and methyl hydroxypropyl cellulose, and mixtures thereof Particularly suitable mixtures are mixtures of sodium carboxymethyl cellulose and methyl cellulose, the carboxymethyl cellulose normally having a degree of substitution of 0.5 to 0.8 carboxymethyl groups per anhydroglucose unit while the methyl cellulose has a degree of substitution of 1.2 to 2 methyl groups per anhydroglucose unit. The mixtures preferably contain alkali metal carboxymethyl cellulose and nonionic cellulose ether in ratios by weight of 80:20 to 40:60 and, more particularly, 75:25 to 50:50. Corresponding cellulose ether mixtures may be used in solid form or as aqueous solutions which may be preswollen in the usual way. According to the invention, native starch which is made up of amylose and amylopectin is a particularly preferred support. Native starch is starch obtainable as an extract from natural sources, for example from rice, potatoes, corn and wheat. Native starch is a standard commercial product and is therefore readily available. Suitable support materials are individual compounds or several of the compounds mentioned above selected in particular from the group of alkali metal carbonates, alkali metal sulfates, alkali metal phosphates, zeolites, water-soluble layered silicates, alkali metal silicates, polycarboxylates, carboxymethyl cellulose, polyacrylate/polymethacrylate and starch. Mixtures of alkali metal carbonates, more particularly sodium carbonate, alkali metal silicates, more particularly sodium silicate, alkali metal sulfates, more particularly sodium sulfate, zeolites, polycarboxylates, more particularly poly(meth)acrylate, and cellulose ethers and native starch are particularly suitable. The support materials may have the following composition:

0 to 2% by weight cellulose ether 0 to 75% by weight native starch 0 to 30% by weight alkali metal silicate 0 to 75% by weight alkali metal sulfate 0 to 95% by weight alkali metal carbonate 0 to 95% by weight zeolites 0 to 5% by weight polycarboxylates, the sum having to come to 100% by weight.

Besides the silicones, wax-like, water-insoluble defoamer compounds may be used in accordance with the present invention. "Wax-like" compounds are understood to be compounds which have a melting point at atmospheric pressure above 25° C. (room temperature), preferably above 50° C. and more preferably above 70° C. The wax-like defoamers optionally present in accordance with the invention are substantially insoluble in water, i.e. their solubility in 100 g of water at 20° C. is less than 0.1% by weight. In principle, any wax-like defoamers known from the prior art may additionally be present. Suitable wax-like compounds are, for example, bisamides, fatty alcohols, fatty acids, carboxylic acid esters of monohydric and polyhydric alcohol and paraffin waxes or mixtures thereof. Bisamides derived from saturated fatty acids containing 12 to 22 and preferably 14 to 18 carbon atoms and from alkylenediamines containing 2 to 7 carbon atoms are suitable. Suitable fatty acids are lauric acid, myristic acid, stearic acid, arachic acid and behenic acid and the mixtures thereof obtainable from natural fats or hydrogenated oils, such as tallow or hydrogenated palm oil. Suitable diamines are, for example, ethylenediamine, 1,3-propylenediamine, tetramethylenediamine, pentamethylenediamine, hexamethylenediamine, p-phenylenediamine and toluylenediamine. Preferred diamines are ethylenediamine and hexamethylenediamine. Particularly preferred bisamides are bis-myristoyl ethylenediamine, bis-palmitoyl ethylenediamine, bis-stearoyl ethylenediamine and mixtures thereof and the corresponding derivatives of hexamethylenediamine. Suitable carboxylic acid esters are derived from carboxylic acids containing 12 to 28 carbon atoms. The esters in question are, in particular, esters of behenic acid, stearic acid, oleic acid, palmitic acid, myristic acid and/or lauric acid. The alcohol moiety of the carboxylic acid ester contains monohydric or polyhydric alcohols containing 1 to 28 carbon atoms in the hydrocarbon chain. Examples of suitable alcohols are behenyl alcohol, arachidyl alcohol, cocoalcohol, 12-hydroxystearyl alcohol, oleyl alcohol and lauryl alcohol and ethylene glycol, glycerol, methanol, ethanol, isopropanol, vinyl alcohol, sucrose, eiythritol, pentaerythritol, sorbitan and/or sorbitol. Preferred esters are esters of methanol, ethylene glycol, glycerol and sorbitan, the acid moiety of the ester being selected in particular from behenic acid, stearic acid, oleic acid, palmitic acid or myristic acid. Suitable esters of polyhydric alcohols are, for example, xylitol monopalmitate, pentaerythritol monostearate, glycerol monostearate, ethylene glycol monostearate and sorbitan monostearate, sorbitan palmitate, sorbitan monolaurate, sorbitan dilaurate, sorbitan distearate, sorbitan dibehenate, sorbitan dioleate and mixed tallow alkyl sorbitan monoesters and diesters. Suitable glycerol esters are the mono-, di- or triesters of glycerol and the carboxylic acids mentioned, the monoesters and diesters being preferred. Glycerol monostearate, glycerol monooleate, glycerol monopalmitate, glycerol monobehenate and glycerol distearate are examples. Examples of suitable natural esters are beeswax and carnauba wax, carnauba wax being a mixture of carnauba acid alkyl esters, often in combination with small amounts of free camauba acid, other long-chain acids, high molecular weight alcohols and hydrocarbons. Suitable carboxylic acids as another defoamer compound are, in particular, behenic acid, stearic acid, oleic acid, palmitic acid, myristic acid and lauric acid and the mixtures thereof obtainable from natural fats or optionally hydrogenated oils, such as tallow or hydrogenated palm oil. Saturated fatty acids containing 12 to 22 and, more particularly, 14 to 18 carbon atoms are preferred. Suitable fatty alcohols as another defoamer compound are the hydrogenated products of the described fatty acids. According to the invention, the preferred paraffin wax as another defoamer compound is generally a complex mixture with no clearly defined melting point. For characterization, its melting range is normally determined by differential thermoanalysis (DTA), as described in "The Analyst" 87 (1962), 420, and/or its solidification point is determined. The solidification point is understood to be the temperature at which the paraffin changes from the liquid state into the solid state by slow cooling. Paraffins which are entirely liquid at room temperature, i.e. paraffins with a solidification point below 25° C., are not suitable for use in accordance with the invention. It is possible, for example, to use the paraffin wax mixtures known from EP 0309931 A1 of, for example, 26% by weight to 49% by weight of microcrystalline paraffin wax with a solidification point of 62° C. to 90° C., 20% by weight to 49% by weight of hard paraffin with a solidification point of 42° C. to 56° C. and 2% by weight to 25% by weight of soft paraffin with a solidification point of 35° C. to 40° C. Paraffins or paraffin mixtures which solidify at temperatures of 30° C. to 90° C. are preferably used. It is important in this connection to bear in mind that even paraffin wax mixtures which appear solid at room temperature may contain different amounts of liquid paraffin. In the paraffin waxes suitable for use in accordance with the invention, this liquid component is as small as possible and is preferably absent altogether. Thus, particularly preferred paraffin wax mixtures have a liquid component at 30° C. of less than 10% by weight and, more particularly, from 2% by weight to 5% by weight, a liquid component at 40° C. of less than 30% by weight, preferably from 5% by weight to 25% by weight and more preferably from 5% by weight to 15% by weight, a liquid component at 60° C. of 30% by weight to 60% by weight and preferably 40% by weight to 55% by weight, a liquid component at 80° C. of 80% by weight to 100% by weight and a liquid component at 90° C. of 100% by weight. In particularly preferred paraffin wax mixtures, the temperature at which a liquid component of 100% by weight of the paraffin wax is reached is still below 85° C. and, more particularly, between 75° C. and 82° C. Paraffin waxes of the described type are particularly suitable for the purposes of the present invention.

According to the invention, an intermediate product of the support materials and the wax-like defoamers optionally present is initially prepared. If the intermediate product additionally contains wax-like defoamers, the percentage by weight of support materials is preferably from 20 to 98% by weight and more preferably from 35 to 95% by weight while the percentage by weight of wax-like defoamers is preferably from 2 to 80% by weight and more preferably from 5 to 65% by weight, based on intermediate product. The support material may be produced in the usual way by spray drying an aqueous slurry. If wax-like defoamers are additionally used, they may be applied, for example, by applying the molten wax-like defoamers to the spray-dried granular support material, for example by gradual addition, more particularly in the form of a spray. The support material is kept in motion, preferably by mixing elements or by fluidization, in order to guarantee uniform impregnation of the support material. The spray mixers used may be operated continuously or discontinuously.

In another preferred embodiment of the invention, intermediate products additionally containing wax-like defoamers are produced by dissolving or suspending the support material in water, dispersing the wax-like defoamers in the resulting solution or suspension and then spray-drying the resulting slurry. A water-soluble, non-surfactant dispersion stabilizer in the form of a polymer swellable in water may be added to the dispersion. Polymers suitable for this purpose are the above-mentioned cellulose ethers, homopolymers and copolymers of unsaturated carboxylic acids, such as acrylic acid, maleic acid and copolymerizable vinyl compounds, such as vinyl ether, acrylamide and ethylene. The quantity in which these dispersion stabilizers are added to the aqueous slurry is preferably no more than 5% by weight and, in particular, from 1% by weight to 3% by weight, based on the intermediate product formed. Depending on the nature or solubility of the support materials, the water content of the slurry may be between 30% by weight and 60% by weight. The spray drying of the dispersion may be carried out in known manner in so-called spray drying towers using hot drying gases flowing in co-current or countercurrent. Drying with drying gases flowing in co-current with the material to be spray dried is preferred because, with paraffin-containing intermediate products in particular, the loss of activity attributable to the potential hot air volatility of certain constituents of the paraffin can be reduced to a minimum in this way.

According to the invention, spraying of the aqueous silicone emulsions onto the solid intermediate product, accompanied by drying and granulation, is preferably carried out continuously in a fluidized bed, more particularly in a continuously operating fluidized bed, by the so-called SKET process. In this process, the aqueous silicone emulsions are introduced into the fluidized bed through one or more nozzles. In the process according to the invention, the intermediate product of support material and wax-like defoamers is added at the same time as, but separately from, the aqueous silicone emulsions, preferably through an automatically controlled solids metering system. The product streams of aqueous silicone emulsion and added intermediate product are controlled in such a way as to give defoamer granules which preferably contain 2.0 to 25% by weight and more particularly 5.0 to 20% by weight of silicone, expressed as silicone and based on defoamer granules. The balance to 100% by weight of the defoamer granules is the intermediate product already described. In the fluidized bed, the aqueous silicone emulsion impinges on the added intermediate products with evaporation of the water so that partly dried to dried cores are formed. The cores thus formed are coated with more aqueous silicone emulsion introduced or with the added intermediate products, granulated and again simultaneously dried. The simultaneous drying and granulation process takes place in the fluidized bed above a circular diffusor plate provided with throughflow openings for the drying air, the product to be dried remaining stationary above the diffusor plate during this drying phase, so that build-up granulation takes place. Further particulars of the so-called SKET process can be found in U.S. Pat. No. 5,516,447, the entire contents of which are incorporated herein by reference. One particular advantage of the process is that the defoamer granules formed are graded or classified in regard to their particle size and hence in regard to.their weight by the inflowing drying air, so that granules which have reached the required size or weight drop from the fluidized bed onto a base plate and then into a discharge lock.

Preferred fluidized beds have circular base plates (diffusor plates) between 0.4 and 5 m in diameter, for example 1.2 m or 2.5 m in diameter. The base plate may be a perforated plate, a Conidur plate (a product of Hein & Lehmann, Federal Republic of Germany) or a perforated plate of which the perforations (throughflow openings) are covered by a gauze with mesh widths smaller than 600 $\mu$m. The gauze may be arranged in or above the throughflow openings. However, the gauze is preferably located immediately below the throughflow openings of the diffusor plate. This is preferably done by sintering on a metal gauze with the appropriate mesh width. The metal gauze preferably consists of the same material as the diffusor plate, more particularly stainless steel. The mesh width of the gauze mentioned is preferably between 200 and 400 $\mu$m.

According to the invention, the process is preferably carried out at fluidizing air flow rates of 1 to 8 m/s and, more particularly, 1.5 to 5.5 m/s. The granules are preferably discharged via a grading stage. Grading is preferably carried out by a stream of drying air flowing in countercurrent (grading air) which is controlled in such a way that only particles beyond a certain particle size are removed from the fluidized bed while smaller particles are retained therein. In one preferred embodiment, the inflowing air is made up of the heated or unheated grading air and the heated bottom air. The bottom air temperature is preferably between 80 and 400° C. The fluidizing air cools through heat losses and through the heat of evaporation, its temperaturexas measured preferably about 5 cm above the base plate—being in the range from 60 to 120° C., preferably in the range from 65 to 90° C. and more preferably in the range from 70 to 85° C. The air exit temperature is preferably between 60 and 120° C. and more particularly below 80° C.

The residence time of the product to be dried, which remains stationary above the diffusor plate, is preferably between 5 and 60 minutes. According to the invention, the defoamer granules are regarded as dried as long as the free water content is below 10% by weight and preferably from 0.1 to 2% by weight, based on the final granules. In the preferred embodiment where the process is carried out in a fluidized bed, a starting material serving as an initial support for the aqueous silicone emulsion sprayed in must be present at the beginning of the process. This starting material may consist of the added intermediate products or, in one particular embodiment, of the defoamer granules themselves which were obtained in a previous process cycle. Defoamer granules above 0.2 and below 0.9 mm in size are preferably used as the starting material and are preferably fed in through a roller mill. The defoamer granules obtained from the fluidized bed are then preferably cooled in a separate fluidized bed and are graded by means of a sieve into granules between 0.9 and 5 mm in size as accepts, into granules above 5 mm in size as the oversize fraction and into granules below 0.9 mm in size as the undersize fraction. The granules of the undersize fraction are returned to the fluidized bed. The oversize fraction is ground, preferably to particles below 0.9 mm in size, and likewise returned to the fluidized bed.

The defoamer granules according to the invention are spherical free-flowing products which do not emit any dust. They have a good defoaming effect and may be used both in spray-dried and in granulated surface-active compositions. Accordingly, the present invention also relates to their use for the production of solid laundry detergent, dishwashing detergent and cleaning compositions. The defoamer granules may be present in quantities of 0.2 to 7.0% by weight and preferably in quantities of 0.5 to 4.0% by weight, based on the composition. The defoamer granules are easy to incorporate.

Primary constituents of the laundry detergents, dishwashing detergents and cleaners obtainable using the defoamer granules according to the invention are anionic, nonionic, cationic, amphoteric and/or zwitterionic surfactants, but preferably anionic surfactants and combinations of anionic and nonionic surfactants. Typical examples of anionic surfactants are soaps, alkyl benzenesulfonates, alkane sulfonates, olefin sulfonates, alkyl ether sulfonates, glycerol ether sulfonates, a-methyl ester sulfonates, sulfofatty acids, alkyl sulfates, fatty alcohol ether sulfates, glycerol ether sulfates, hydroxy mixed ether sulfates, monoglyceride (ether) sulfates, fatty acid amide (ether) sulfates, mono- and dialkyl sulfosuccinates, mono- and dialkyl sulfosuccinamates, sulfotriglycerides, amide soaps, ether carboxylic acids and salts thereof, fatty acid isethionates, fatty acid sarcosinates, fatty acid taurides, N-acyl amino acids such as, for example, acyl lactylates, acyl tartrates, acyl glutamates and acyl aspartates, alkyl oligoglucoside sulfates, protein fatty acid condensates (especially wheat-based vegetable products) and alkyl (ether)phosphates. If the anionic surfactants contain polyglycol ether chains, the polyglycol ether chains may have a conventional homolog distribution, although they preferably have a narrow homolog distribution. Alkyl benzenesulfonates, alkyl sulfates, soaps, alkanesulfonates, olefin sulfonates, methyl ester sulfonates and mixtures thereof are preferably used. Preferred alkyl benzenesulfonates preferably correspond to formula (I):

$$R—Ph—SO_3X \quad (I)$$

in which R is a branched, but preferably linear alkyl group containing 10 to 18 carbon atoms, Ph is a phenyl group and X is an alkali metal and/or alkaline earth metal, ammonium, alkylammonium, alkanolammonium or glucammonium. Of these alkyl benzenesulfonates, dodecyl benzenesulfonates, tetradecyl benzenesulfonates, hexadecyl benzenesulfonates and technical mixtures thereof in the form of the sodium salts are particularly suitable. Alkyl and/or alkenyl sulfates, which are also often referred to as fatty alcohol sulfates, are understood to be the sulfation products of primary and/or secondary alcohols which preferably correspond to formula (II):

$$R^2O—SO_3Y \quad (II)$$

in which R is a linear or branched, aliphatic alkyl and/or alkenyl group containing 6 to 22 and preferably 12 to 18 carbon atoms and Y is an alkali metal and/or alkaline earth metal, ammonium, alkylammonium, alkanolammonium or glucammonium. Typical examples of alkyl sulfates which may be used in accordance with the invention are the sulfation products of caproic alcohol, caprylic alcohol, capric alcohol, 2-ethylhexyl alcohol, lauryl alcohol, myristyl alcohol, cetyl alcohol, palmitoleyl alcohol, stearyl alcohol, isostearyl alcohol, oleyl alcohol, elaidyl alcohol, petroselinyl alcohol, arachyl alcohol, gadoleyl alcohol, behenyl alcohol and erucyl alcohol and the technical mixtures thereof obtained by high-pressure hydrogenation of technical methyl ester fractions or aldehydes from Roelen's oxo-synthesis. The sulfation products may advantageously be used in the form of their alkali metal salts, more especially their sodium salts. Alkyl sulfates based on $C_{16/18}$ tallow fatty alcohols or vegetable fatty alcohols with a comparable C-chain distribution in the form of their sodium salts are particularly preferred. In the case of branched primary types, the alcohols are oxoalcohols which are obtainable, for example, by reacting carbon monoxide and hydrogen on α-olefins by the Shop process. Corresponding alcohol mixtures are commercially available under the trade names of DOBANOL® or NEODOL®. Suitable alcohol mixtures are DOBANOL 91®, 23®, 25® and 45®. Another possibility are the oxoalcohols obtained by the standard oxo process of Unichema or Condea in which carbon monoxide and hydrogen are added onto olefins. These alcohol mixtures are a mixture of highly branched alcohols and are commercially available under the name of LIAL®. Suitable alcohol mixtures are LIAL 91®, 111®, 123®, 125®, 145®. Finally, soaps are understood to be fatty acid salts corresponding to formula (III):

$$R^3CO—OX \quad (III)$$

in which $R^3CO$ is a linear or branched, saturated or unsaturated acyl group containing 6 to 22 and preferably 12 to 18 carbon atoms and X is alkali and/or alkaline earth metal, ammonium, alkylammonium or alkanolammonium. Typical examples are the sodium, potassium, magnesium, ammonium and triethanolammonium salts of caproic acid, caprylic acid, 2-ethylhexanoic acid, capric acid, lauric acid, isotridecanoic acid, myristic acid, palmitic acid, palmitoleic acid, stearic acid, isostearic acid, oleic acid, elaidic acid, petroselic acid, linoleic acid, linolenic acid, elaeostearic acid, arachic acid, gadoleic acid, behenic acid and erucic acid and technical mixtures thereof Cocofatty acid or palm kernel oil fatty acid in the form of their sodium or potassium salts are preferably used.

Typical examples of nonionic surfactants are fatty alcohol polyglycol ethers, alkylphenol polyglycol ethers, fatty acid polyglycol esters, fatty acid amide polyglycol ethers, fatty amine polyglycol ethers, alkoxylated triglycerides, mixed ethers and mixed formals, alk(en)yl oligoglycosides, fatty acid-N-alkyl glucamides, protein hydrolyzates (more particularly wheat-based vegetable products), polyol fatty acid esters, sugar esters, sorbitan esters, polysorbates and amine oxides. If the nonionic surfactants contain polyglycol ether chains, the polyglycol ether chains may have a conventional homolog distribution, although they preferably have a narrow homolog distribution. Fatty alcohol polyglycol ethers, alkoxylated fatty acid lower alkyl esters or alkyl oligoglycosides are preferably used. Preferred fatty alcohol polyglycol ethers correspond to formula (IV):

$$R^4O(CH_2CHR^5O)_nH \quad (IV)$$

in which $R^4$ is a linear or branched alkyl and/or alkenyl group containing 6 to 22 and preferably 12 to 18 carbon atoms, $R^5$ is hydrogen or methyl and n is a number of 1 to 20. Typical examples are products of the addition of, on average, 1 to 20 and preferably 5 to 10 moles of ethylene and/or propylene oxide onto caproic alcohol, caprylic alcohol, 2-ethylhexyl alcohol, capric alcohol, lauryl alcohol, isotridecyl alcohol, myristyl alcohol, cetyl alcohol, palmitoleyl alcohol, stearyl alcohol, isostearyl alcohol, oleyl alcohol, elaidyl alcohol, petroselinyl alcohol, linolyl alcohol, linolenyl alcohol, elaeostearyl alcohol, arachyl alcohol, gadoleyl alcohol, behenyl alcohol, erucyl alcohol and brassidyl alcohol and technical mixtures thereof Products of the addition of 3, 5 or 7 moles of ethylene oxide onto technical cocofatty alcohols are particularly preferred. Suitable alkoxylated fatty acid lower alkyl esters are surfactants corresponding to formula (V):

$$R^6CO—(OCH_2CHR^7)_mOR^8 \quad (V)$$

in which $R^6CO$ is a linear or branched, saturated and/or unsaturated acyl group containing 6 to 22 carbon atoms, $R^7$ is hydrogen or methyl, $R^8$ is a linear or branched alkyl group containing 1 to 4 carbon atoms and m is a number of 1 to 20. Typical examples are the formal insertion products of, on average, 1 to 20 and preferably 5 to 10 moles of ethylene and/or propylene oxide into the methyl, ethyl, propyl, isopropyl, butyl and tert.butyl esters of caproic acid, caprylic acid, 2-ethylhexanoic acid, capric acid, lauric acid, isotridecanoic acid, myristic acid, palmitic acid, palmitoleic acid, stearic acid, isostearic acid, oleic acid, elaidic acid, petroselic acid, linoleic acid, linolenic acid, elaeostearic acid, arachic acid, gadoleic acid, behenic acid and erucic acid and technical mixtures thereof The products are normally prepared by insertion of the alkylene oxides into the carbon ester bond in the presence of special catalysts, for example calcined hydrotalcite. Reaction products of on average 5 to 10 moles of ethylene oxide into the ester bond of technical cocofatty acid methyl esters are particularly preferred. Alkyl and alkenyl oligoglycosides, which are also preferred nonionic surfactants, normally correspond to formula (VI):

$$R^9O—[G]_p \quad (VI)$$

in which $R^9$ is an alkyl and/or alkenyl group containing 4 to 22 carbon atoms, G is a sugar unit containing 5 or 6 carbon atoms and p is a number of 1 to 10. They may be obtained by the relevant methods of preparative organic chemistry. EP-A1 0 301 298 and WO 90/03977 are cited as representative of the extensive literature available on the subject. The alkyl and/or alkenyl oligoglycosides may be derived from aldoses or ketoses containing 5 or 6 carbon atoms, preferably glucose. Accordingly, the preferred alkyl and/or alkenyl oligoglycosides are alkyl and/or alkenyl oligoglucosides. The index p in general formula (VI) indicates the degree of oligomerization (DP), i.e. the distribution of mono- and oligoglycosides, and is a number of 1 to 10. Whereas p in a given compound must always be an integer and, above all, may assume a value of 1 to 6, the value p for a certain alkyl oligoglycoside is an analytically determined calculated quantity which is generally a broken number. Alkyl and/or alkenyl oligoglycosides having an average degree of oligomerization p of 1.1 to 3.0 are preferably used. Alkyl and/or alkenyl oligoglycosides having a degree of oligomerization of less than 1.7 and, more particularly, between 1.2 and 1.4 are preferred from the applicational point of view. The alkyl or alkenyl radical $R^9$ may be derived from primary alcohols containing 4 to 11 and preferably 8 to 10 carbon atoms. Typical examples are butanol, caproic alcohol, caprylic alcohol, capric alcohol and undecyl alcohol and the technical mixtures thereof obtained, for example, in the hydrogenation of technical fatty acid methyl esters or in the hydrogenation of aldehydes from Roelen's oxosynthesis. Alkyl oligoglucosides having a chain length of $C_8$ to $C_{10}$ (DP=1 to 3), which are obtained as first runnings in the separation of technical $C_{8-18}$ coconut oil fatty alcohol by distillation and which may contain less than 6% by weight of $C_{12}$ alcohol as an impurity, and also alkyl oligoglucosides based on technical $C_{9/11}$ oxoalcohols (DP=1 to 3) are preferred. In addition, the alkyl or alkenyl radical $R^9$ may also be derived from primary alcohols containing 12 to 22 and preferably 12 to 14 carbon atoms. Typical examples are lauryl alcohol, myristyl alcohol, cetyl alcohol, palmitoleyl alcohol, stearyl alcohol, isostearyl alcohol, oleyl alcohol, elaidyl alcohol, petroselinyl alcohol, arachyl alcohol, gadoleyl alcohol, behenyl alcohol, erucyl alcohol, brassidyl alcohol and technical mixtures thereof which may be obtained as described above. Alkyl oligoglucosides based on hydrogenated $C_{12/14}$ cocoalcohol with a DP of 1 to 3 are preferred.

Typical examples of cationic surfactants are, in particular, tetraalkylammonium compounds such as, for example, dimethyl distearyl ammonium chloride or Hydroxyethyl Hydroxycetyl Dimmonium Chloride (Dehyquart E) and esterquats. Estersquats are, for example, quaternized fatty acid triethanolamine ester salts corresponding to formula (VII):

(VII)

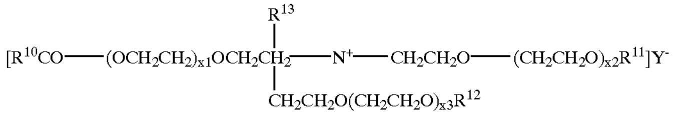

in which $R^{10}CO$ is an acyl group containing 6 to 22 carbon atoms, $R^{11}$ and $R^{12}$ independently of one another represent hydrogen or have the same meaning as $R^{10}CO$, $R^{13}$ is an alkyl group containing 1 to 4 carbon atoms or a $(CH_2CH_2O)_{x4}H$ group, x1, x2 and x3 together stand for 0 or numbers of 1 to 12, x4 is a number of 1 to 12 and Y is halide, alkyl sulfate or alkyl phosphate. Typical examples of esterquats which may be used in accordance with the invention are products based on caproic acid, caprylic acid, capric acid, lauric acid, myristic acid, palmitic acid, isostearic acid, stearic acid, oleic acid, elaidic acid, arachic acid, behenic acid and erucic acid and the technical mixtures thereof obtained for example in the pressure hydrolysis of natural fats and oils. Technical $C_{12/18}$ cocofatty acids and, in particular, partly hydrogenated $C_{16/18}$ tallow or palm oil fatty acids and high-elaidic $C_{16/18}$ fatty acid cuts are preferably used. To produce the quaternized esters, the fatty acids and the triethanolamine may be used in a molar ratio of 1.1:1 to 3:1. With the performance properties of the esterquats in mind, a ratio of 1.2:1 to 2.2:1 and preferably 1.5:1 to 1.9:1 has proved to be particularly advantageous.

The preferred esterquats are technical mixtures of mono-, di- and triesters with an average degree of esterification of 1.5 to 1.9 and are derived from technical $C_{16/18}$ tallow or palm oil fatty acid (iodine value 0 to 40). In performance terms, quaternized fatty acid triethanolamine ester salts corresponding to formula (VII), in which $R_{10}CO$ is an acyl group containing 16 to 18 carbon atoms, $R^{11}$ has the same meaning as $R^{10}CO$, $R^{12}$ is hydrogen, $R^{13}$ is a methyl group, x1, x2 and x3 stand for 0 and Y stands for methyl sulfate, have proved to be particularly advantageous. Other suitable esterquats besides the quatemized fatty acid triethanolamine ester salts are quaternized ester salts of fatty acids with diethanolalkyamines corresponding to formula (VIII):

(VIII)

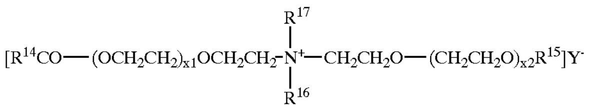

in which $R^{14}CO$ is an acyl group containing 6 to 22 carbon atoms, $R^{15}$ is hydrogen or has the same meaning as $R^{14}CO$, $R^{16}$ and $R^{17}$ independently of one another are alkyl groups containing 1 to 4 carbon atoms, x1 and x2 together stand for 0 or numbers of 1 to 12 and Y stands for halide, alkyl sulfate or alkyl phosphate. Finally, another group of suitable esterquats are the quatemized ester salts of fatty acids with 1,2-dihydroxypropyl dialkylamines corresponding to formula (IX):

(IX)

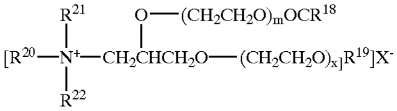

in which $R^{18}CO$ is an acyl group containing 6 to 22 carbon atoms, $R^{19}$ is hydrogen or has the same meaning as $R^{18}CO$, $R^{20}$, $R^{21}$ and $R^{22}$ independently of one another are alkyl groups containing 1 to 4 carbon atoms, x1 and x2 together stand for 0 or numbers of 1 to 12 and Y stands for halide, alkyl sulfate or alkyl phosphate. Finally, other suitable esterquats are substances in which the ester bond is replaced by an amide bond and which—preferably based on diethylenetriamine—correspond to formula (X):

(X)

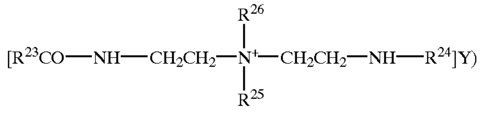

in which $R^{23}CO$ is an acyl group containing 6 to 22 carbon atoms, $R^{24}$ is hydrogen or has the same meaning as $R^{23}CO$, $R^{25}$ and $R^{26}$ independently of one another are alkyl groups containing 1 to 4 carbon atoms and Y is halide, alkyl sulfate or alkyl phosphate. Amide esterquats such as these are commercially obtainable, for example, under the name of INCROQUAT® (Croda).

As amphoteric or zwitterionic surfactants, the compositions may contain alkyl betaines, alkyl amidobetaines, aminopropionates, aminoglycinates, imidazolinium betaines and/or sulfobetaines. Examples of suitable alkyl betaines are the carboxyalkylation products of secondary and, in particular, tertiary amines corresponding to formula (XI):

(XI)

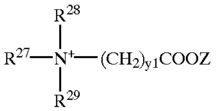

in which $R^{27}$ represents alkyl and/or alkenyl groups containing 6 to 22 carbon atoms, $R^{28}$ represents hydrogen or alkyl groups containing 1 to 4 carbon atoms, $R^{29}$ represents alkyl groups containing 1 to 4 carbon atoms, yl is a number of 1 to 6 and Z is an alkali metal and/or alkaline earth metal or ammonium. Typical examples are the carboxymethylation products of hexylmethyl amine, hexyldimethyl amine, octyldimethyl amine, decyldimethyl amine, dodecylmethyl amine, dodecyldimethyl amine, dodecylethylmethyl amine, $C_{12/14}$ cocoalkyldimethyl amine, myristyldimethyl amine, cetyldimethyl amine, stearyldimethyl amine, stearylethylmethyl amine, oleyldimethyl amine, $C_{16/18}$ tallow alkyldimethyl amine and technical mixtures thereof Also suitable are carboxyalkylation products of amidoamines corresponding to formula (XI):

(XII)

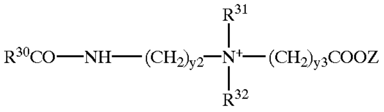

in which $R^{30}CO$ is an aliphatic acyl group containing 6 to 22 carbon atoms and 0 or 1 to 3 double bonds, $R^{31}$ is hydrogen or represents alkyl groups containing 1 to 4 carbon atoms, $R^{32}$ represents alkyl groups containing 1 to 4 carbon atoms, y2 and y3 independently of one another are numbers of 1 to 6 and Z is an alkali metal and/or alkaline earth metal or ammonium. Typical examples are reaction products of fatty acids containing 6 to 22 carbon atoms, namely caproic acid, caprylic acid, capric acid, lauric acid, myristic acid, palmitic acid, palmitoleic acid, stearic acid, isostearic acid, oleic acid, elaidic acid, petroselic acid, linoleic acid, linolenic acid, elaeostearic acid, arachic acid, gadoleic acid, behenic acid and erucic acid and technical mixtures thereof, with N,N-dimethylaminoethyl amine, N,N-dimethylaminopropyl amine, N,N-diethylaminoethyl amine and N,N-diethylaminopropyl amine which are condensed with sodium chloroacetate. A condensation product of $C_{8/18}$-cocofatty acid-N,N-dimethylaminopropyl amide with sodium chloroacetate is preferably used.

Imidazolinium betaines may also be used. These compounds are also known compounds which may be obtained, for example, by cyclizing condensation of 1 or 2 moles of fatty acid with polyfunctional amines such as, for example, aminoethyl ethanolamine, (AEEA) or diethylenetriamine. The corresponding carboxyalkylation products are mixtures of different open-chain betaines. Typical examples are condensation products of the fatty acids mentioned above with AEEA, preferably imidazolines based on lauric acid or—again—$C_{12/14}$ cocofatty acid which are subsequently betainized with sodium chloroacetate.

The laundry detergent, dishwashing detergent and cleaning compositions may also contain additional inorganic and organic builders, suitable inorganic builders mainly being zeolites, crystalline layered silicates, amorphous silicates and—where permitted—also phosphates such as, for example, tripolyphosphate.

The finely crystalline, synthetic zeolite containing bound water often used as a detergent builder is preferably zeolite A and/or zeolite P. Zeolite MAP® (Crosfield) is a particularly preferred P-type zeolite. However, zeolite X and mixtures of A, X and/or P and also Y are also suitable. A co-crystallized sodium/potassium aluminium silicate of zeolite A and zeolite X commercially available as VEGOBOND AX® (from Condea Augusta S.p.A.) is also of particular interest. The zeolite may be used in the form of a spray-dried powder or even in the form of an undried stabilized suspension still moist from its production. Where the zeolite is used in the form of a suspension, the suspension may contain small additions of nonionic surfactants as stabilizers, for example 1 to 3% by weight, based on zeolite, of ethoxylated $C_{12-18}$ fatty alcohols containing 2 to 5 ethylene oxide groups, $C_{12-14}$ fatty alcohols containing 4 to 5 ethylene oxide groups or ethoxylated isotridecanols. Suitable zeolites have a mean particle size of less than 10 $\mu$m (volume distribution, as measured by the Coulter Counter method) and contain preferably 18 to 22% by weight and more preferably 20 to 22% by weight of bound water.

Suitable substitutes or partial substitutes for phosphates and zeolites are crystalline layered sodium silicates corresponding to the general formula $NaMSi_xO_{2x+1}.yH_2O$, where M is sodium or hydrogen, x is a number of 1.9 to 4 and y is a number of 0 to 20, preferred values for x being 2, 3 or 4. Crystalline layer silicates such as these are described, for example, in European patent application EP 0 164 514 A1. Preferred crystalline layer silicates corresponding to the above formula are those in which M is sodium and x assumes the value 2 or 3. Both β- and δ-sodium disilicates $Na_2Si_2O_5.yH_2O$ are particularly preferred, β-sodium disilicate being obtainable, for example, by the process described in International patent application WO 91/08171. Other suitable layered silicates are known, for example, from patent applications DE 2334899 A1, EP 0026529 A1 and DE 3526405 A1. The suitability of these layered silicates is not limited to a particular composition or structural formula. However, smectites, more especially bentonites, are preferred for the purposes of the present invention. Suitable layered silicates which belong to the group of water-swellable smectites are, for example, those corresponding to the following general formulae:

| | |
|---|---|
| $(OH)_4Si_{8-y}Al_y(Mg_xAl_{4-x})O_{20}$ | montmorrilonite |
| $(OH)_4Si_{8-y}Al_y(Mg_{6-z}Li_z)O_{20}$ | hectorite |
| $(OH)_4Si_{8-y}Al_y(Mg_{6-z}Al_z)O_{20}$ | saponite |

where x=0 to 4, y=0 to 2 and z=0 to 6. Small amounts of iron may additionally be incorporated in the crystal lattice of the layer silicates corresponding to the above formulae. In addition, by virtue of their ion-exchanging properties, the layered silicates may contain hydrogen, alkali metal and alkaline-earth metal ions, more particularly $Na^{30}$ and $Ca^{2+}$. The quantity of water of hydration is generally in the range from 8 to 20% by weight and is dependent upon the degree of swelling or upon the treatment method. Suitable layered silicates are known, for example, from U.S. Pat. No. 3,966, 629 U.S. Pat. No. 4,062,647, EP 0026529 A1 and EP 0028432 A1. Layered silicates which, by virtue of an alkali treatment, are largely free from calcium ions and strongly coloring iron ions are preferably used.

Other preferred builders are amorphous sodium silicates with a modulus ($Na_2O:SiO_2$ ratio) of 1:2 to 1:3.3, preferably 1:2 to 1:2.8 and more preferably 1:2 to 1:2.6 which dissolve with delay and exhibit multiple wash cycle properties. The delay in dissolution in relation to conventional amorphous sodium silicates can have been obtained in various ways, for example by surface treatment, compounding, compacting or by overdrying. In the context of the invention, the term "amorphous" is also understood to encompass "X-ray amorphous". In other words, the silicates do not produce any of the sharp X-ray reflexes typical of crystalline substances in X-ray diffraction experiments, but at best one or more maxima of the scattered X-radiation which have a width of several degrees of the diffraction angle. Particularly good builder properties may even be achieved where the silicate particles produce crooked or even sharp diffraction maxima in electron diffraction experiments. This may be interpreted to mean that the products have microcrystalline regions between 10 and a few hundred nm in size, values of up to at most 50 nm and, more particularly, up to at most 20 nm being preferred. So-called X-ray amorphous silicates such as these, which also dissolve with delay in relation to conventional waterglasses, are described for example in German patent application DE-A-4400024 A1. Compacted amorphous silicates, compounded amorphous silicates and overdried X-ray-amorphous silicates are particularly preferred.

The generally known phosphates may of course also be used as builders providing their use should not be avoided on ecological grounds. The sodium salts of the orthophosphates, the pyrophosphates and, in particular, the tripolyphosphates are particularly suitable. Their content is generally no more than 25% by weight and preferably no more than 20% by weight, based on the final composition. In some cases, it has been found that, in combination with other builders, tripolyphosphates in particular produce a synergistic improvement in multiple wash cycle performance, even in small quantities of up to at most 10% by weight, based on the final composition.

Useful organic builders are, for example, the polycarboxylic acids usable in the form of their sodium salts, such as citric acid, adipic acid, succinic acid, glutaric acid, tartaric acid, sugar acids, aminocarboxylic acids, nitrilotriacetic acid (NTA), providing its use is not ecologically unsafe, and mixtures thereof Preferred salts are the salts of the polycarboxylic acids, such as citric acid, adipic acid, succinic acid, glutaric acid, tartaric acid, sugar acids and mixtures thereof The acids per se may also be used. Besides their building effect, the acids also typically have the property of an acidifying component and, hence, also serve to establish a relatively low and mild pH value in detergents or cleaners. Citric acid, succinic acid, glutaric acid, adipic acid, gluconic acid and mixtures thereof are particularly mentioned in this regard.

Other suitable organic builders are dextrins, for example oligomers or polymers of carbohydrates which may be obtained by partial hydrolysis of starches. The hydrolysis may be carried out by standard methods, for example acid- or enzyme-catalyzed methods. The end products are preferably hydrolysis products with average molecular weights of 400 to 500,000. A polysaccharide with a dextrose equivalent (DE) of 0.5 to 40 and, more particularly, 2 to 30 is preferred, the DE being an accepted measure of the reducing effect of a polysaccharide by comparison with dextrose which has a DE of 100. Both maltodextrins with a DE of 3 to 20 and dry glucose syrups with a DE of 20 to 37 and also so-called yellow dextrins and white dextrins with relatively high molecular weights of 2,000 to 30,000 may be used. A preferred dextrin is described in British patent application 94 19 091 A1. The oxidized derivatives of such dextrins are their reaction products with oxidizing agents which are capable of oxidizing at least one alcohol function of the saccharide ring to the carboxylic acid function. Dextrins thus oxidized and processes for their production are known, for example, from European patent applications EP 0 232 202 A1, EP 0 427 349 A1, EP 0 472 042 A1 and EP 0 542 496 A1 and from International patent applications WO 92/18542, WO 93/08251, WO 93/16110, WO 94/28030, WO 95/07303, WO 95/12619 and WO 95/20608. An oxidized oligosaccharide corresponding to German patent application DE 196 00 018 A1 is also suitable. A product oxidized at $C_6$ of the saccharide ring can be particularly advantageous.

Other suitable co-builders are oxydisuccinates and other derivatives of disuccinates, preferably ethylenediamine disuccinate. The glycerol disuccinates and glycerol trisuccinates described, for example, in U.S. Pat. No. 4,524,009, in U.S Pat. No. 4,639,325, in European patent application EP 0 150 930 A1 and in Japanese patent application JP 93/339896 are also particularly preferred in this connection. The quantities used in zeolite-containing and/or silicate-containing formulations are from 3 to 15% by weight.

Other useful organic co-builders are, for example, acetylated hydroxycarboxylic acids and salts thereof which may optionally be present in lactone form and which contain at least 4 carbon atoms, at least one hydroxy group and at most two acid groups. Co-builders such as these are described, for example, in International patent application WO 95/20029.

Suitable polymeric polycarboxylates are, for example, the sodium salts of polyacrylic acid or polymethacrylic acid, for example those with a relative molecular weight of 800 to 150,000 (based on acid and measured against polystyrenesulfonic acid). Suitable copolymeric polycarboxylates are, in particular, those of acrylic acid with methacrylic acid and of acrylic acid or methacrylic acid with maleic acid. Acrylic acid/maleic acid copolymers containing 50 to 90% by weight of acrylic acid and 50 to 10% by weight of maleic acid have proved to be particularly suitable. Their relative molecular weight, based on free acids, is generally in the range from 5,000 to 200,000, preferably in the range from 10,000 to 120,000 and more preferably in the range from 50,000 to 100,000 (as measured against polystyrenesulfonic acid). The (co)polymeric polycarboxylates may be used either as powders or as aqueous solutions, 20 to 55% by weight aqueous solutions being preferred. Granular polymers are generally added to basic granules of one or more types in a subsequent step. Also particularly preferred are biodegradable polymers of more than two different monomer units, for example those which contain salts of acrylic acid and maleic acid and vinyl alcohol or vinyl alcohol derivatives as monomers in accordance with DE 43 00 772 A1 or salts of acrylic acid and 2-alkylallyl sulfonic acid and sugar derivatives as monomers in accordance with DE 42 21 381 C2. Other preferred copolymers are those described in German patent applications DE 43 03 320 A1 and DE 44 17 734 A1 which preferably contain acrolein and acrylic acid/acrylic acid salts or acrolein and vinyl acetate as monomers. Other preferred builders are polymeric aminodicarboxylic acids, salts and precursors thereof Polyaspartic acids and salts and derivatives thereof are particularly preferred.

Other suitable builders are polyacetals which may be obtained by reaction of dialdehydes with polyol carboxylic acids containing 5 to 7 carbon atoms and at least three hydroxyl groups, for example as described in European patent application EP 0 280 223 A1. Preferred polyacetals are obtained from dialdehydes, such as glyoxal, glutaraldehyde, terephthaldehyde and mixtures thereof and from polyol carboxylic acids, such as gluconic acid and/or glucoheptonic acid.

In addition, the compositions may contain components with a positive effect on the removability of oil and fats from textiles by washing. Preferred oil- and fat-dissolving components include, for example, nonionic cellulose ethers, such as methyl cellulose and methyl hydroxypropyl cellulose containing 15 to 30% by weight of methoxyl groups and 1 to 15% by weight of hydroxypropoxyl groups, based on the nonionic cellulose ether, and the polymers of phthalic acid and/or terephthalic acid known from the prior art or derivatives thereof, more particularly polymers of ethylene terephthalates and/or polyethylene glycol terephthalates or anionically and/or nonionically modified derivatives thereof. Of these, the sulfonated derivatives of phthalic acid and terephthalic acid polymers are particularly preferred.

Other suitable ingredients of the compositions are water-soluble inorganic salts, such as bicarbonates, carbonates, amorphous silicates, normal waterglasses with no pronounced builder properties or mixtures thereof. One particular embodiment is characterized by the use of alkali metal carbonate and/or amorphous alkali metal silicate, above all sodium silicate with a molar $Na_2O:SiO_2$ ratio of 1:1 to 1:4.5 and preferably 1:2 to 1:3.5. The sodium carbonate content of the final compositions is preferably up to 40% by weight and advantageously from 2 to 35% by weight. The content of sodium silicate (without particular building properties) in the compositions is generally up to 10% by weight and preferably between 1 and 8% by weight.

Besides the ingredients mentioned, the compositions may contain other known additives, for example salts of polyphosphonic acids, optical brighteners, enzymes, enzyme stabilizers, small quantities of neutral filler salts and dyes and perfumes and the like.

Among the compounds yielding $H_2O_2$ in water which serve as bleaching agents, sodium perborate tetrahydrate and sodium perborate monohydrate are particularly important. Other useful bleaching agents are, for example, sodium percarbonate, peroxypyrophosphates, citrate perhydrates and $H_2O_2$-yielding peracidic salts or peracids, such as perbenzoates, peroxophthalates, diperazelaic acid, phthaloiminoperacid or diperdodecanedioic acid. The content of peroxy bleaching agents in the compositions is preferably 5 to 35% by weight and more preferably up to 30% by weight, perborate monohydrate or percarbonate advantageously being used.

Suitable bleach activators are compounds which form aliphatic peroxocarboxylic acids containing preferably 1 to 10 carbon atoms and more preferably 2 to 4 carbon atoms and/or optionally substituted perbenzoic acid under perhydrolysis conditions. Substances bearing 0- and/or N-acyl groups with the number of carbon atoms mentioned and/or optionally substituted benzoyl groups are suitable. Preferred bleach activators are polyacylated alkylenediamines, more particularly tetraacetyl ethylenediamine (TAED), acylated triazine derivatives, more particularly 1,5-diacetyl-2,4-dioxohexahydro-1,3,5-triazine (DADHT), acylated glycolurils, more particularly tetraacetyl glycoluril (TAGU), N-acylimides, more particularly N-nonanoyl succinimide (NOSI), acylated phenol sulfonates, more particularly n-nonanoyl or isononanoyloxybenzenesulfonate (n- or iso-NOBS), carboxylic anhydrides, more particularly phthalic anhydride, acylated polyhydric alcohols, more particularly triacetin, ethylene glycol diacetate, 2,5-diacetoxy-2,5-dihydrofuran and the enol esters known from German patent applications DE 196 16 693 A1 and DE 196 16 767 A1, acetylated sorbitol and mannitol and the mixtures thereof (SORMAN) described in European patent application EP 0 525 239 A1, acylated sugar derivatives, more particularly pentaacetyl glucose (PAG), pentaacetyl fiuctose, tetraacetyl xylose and octaacetyl lactose, and acetylated, optionally N-alkylated glucamine and gluconolactone, and/or N-acylated lactams, for example N-benzoyl caprolactam, which are known from International patent applications WO 94/27970, WO 94/28102, WO 94/28103, WO 95/00626, WO 95/14759 and WO 95/17498. The substituted hydrophilic acyl acetals known from German patent application DE 196 16 769 A1 and the acyl lactams described in German patent application DE 196 16 770 and in International patent application WO 95/14075 are also preferably used. The combinations of conventional bleach activators known from German patent application DE 44 43 177 A1 may also be used. Bleach activators such as these are present in the usual quantities, preferably in quantities of 1% by weight to 10% by weight and more preferably in quantities of 2% by weight to 8% by weight, based on the composition as a whole. In addition to or instead of the conventional bleach activators mentioned above, the sulfonimines known from European patents EP 0 446 982 B1 and EP 0 453 003 B1 and/or bleach-boosting transition metal salts or transition metal complexes may also be present as so-called bleach catalysts. Suitable transition metal compounds include, in particular, the manganese-, iron-, cobalt-, ruthenium- or molybdenum-salen complexes known from German patent application DE 195 29 905 A1 and the N-analog compounds thereof known from German patent application DE 196 20 267 A1, the manganese-, iron-, cobalt-, ruthenium- or molybdenum-carbonyl complexes known from German patent application DE 195 36 082 A1, the manganese, iron, cobalt, ruthenium, molybdenum, titanium, vanadium and copper complexes with nitrogen-containing tripod ligands described in German patent application DE 196 05 688, the cobalt-, iron-, copper- and ruthenium-ammine complexes known from German patent application DE 196 20 411 A1, the manganese, copper and cobalt complexes described in German patent application DE 44 16 438 A1, the cobalt complexes described in European patent application EP 0 272 030 A1, the manganese complexes known from European patent application EP 0 693 550 A1, the manganese, iron, cobalt and copper complexes known from European patent EP 0 392 592 A1 and/or the manganese complexes described in European patent EP 0 443 651 B1 or in European patent applications EP 0 458 397 A1, EP 0 458 398 A1, EP 0 549

271 A1, EP 0 549 272 A1, EP 0 544 490 A1 and EP 0 544 519 A1. Combinations of bleach activators and transition metal bleach catalysts are known, for example, from German patent application DE 196 13 103 A1 and from international patent application WO 95/27775. Bleach-boosting transition metal complexes, more particularly with the central atoms Mn, Fe, Co. Cu, Mo. V, Ti and/or Ru, are used in typical quantities, preferably in a quantity of up to 1% by weight, more preferably in a quantity of 0.0025% by weight to 0.25% by weight and most preferably in a quantity of 0.01% by weight to 0.1% by weight, based on the composition as a whole.

Suitable enzymes are, in particular, enzymes from the class of hydrolases, such as proteases, esterases, lipases or lipolytic enzymes, amylases, cellulases or other glycosyl hydrolases and mixtures thereof All these hydrolases contribute to the removal of stains, such as protein-containing, fat-containing or starch-containing stains, and discoloration in the washing process. Cellulases and other glycosyl hydrolases can contribute towards color retention and towards increasing fabric softness by removing pilling and microfibrils. Oxidoreductases may also be used for bleaching and for inhibiting dye transfer. Enzymes obtained from bacterial strains or fungi, such as Bacillus subtilis, Bacillus licheniformis, Streptomyces griseus and Humicola insolens are particularly suitable. Proteases of the subtilisin type are preferably used, proteases obtained from Bacillus lentus being particularly preferred. Of particular interest in this regard are enzyme mixtures, for example of protease and amylase or protease and lipase or lipolytic enzymes or protease and cellulase or of cellulase and lipase or lipolytic enzymes or of protease, amylase and lipase or lipolytic enzymes or protease, lipase or lipolytic enzymes and cellulase, but especially protease- and/or lipase-containing mixtures or mixtures with lipolytic enzymes. Examples of such lipolytic enzymes are the known cutinases. Peroxidases or oxidases have also been successfully used in some cases. Suitable amylases include in particular α-amylases, isoamylases, pullanases and pectinases. Preferred cellulases are cellobio-hydrolases, endoglucanases and β-glucosidases, which are also known as cellobiases, and mixtures thereof Since the various cellulase types differ in their CMCase and avicelase activities, the desired activities can be established by mixing the cellulases in the appropriate ratios. The enzymes may be adsorbed to supports and/or encapsulated in shell-forming substances to protect them against premature decomposition. The percentage content of enzymes, enzyme mixtures or enzyme granules may be, for example, about 0.1 to 5% by weight and is preferably from 0.1 to about 2% by weight.

In addition to the monohydric and polyhydric alcohols, the compositions may contain other enzyme stabilizers. For example, 0.5 to 1% by weight of sodium formate may be used. Proteases stabilized with soluble calcium salts and having a calcium content of preferably about 1.2% by weight, based on the enzyme, may also be used. Apart from calcium salts, magnesium salts also serve as stabilizers. However, it is of particular advantage to use boron compounds, for example boric acid, boron oxide, borax and other alkali metal borates, such as the salts of orthoboric acid ($H_3BO_3$), metaboric acid ($HBO_2$) and pyroboric acid (tetraboric acid $H_2B_4O_7$).

The function of redeposition inhibitors is to keep the soil detached from the fibers suspended in the wash liquor and thus to prevent the soil from being re-absorbed by the washing. Suitable redeposition inhibitors are water-soluble, generally organic colloids, for example the water-soluble salts of polymeric carboxylic acids, glue, gelatine, salts of ether carboxylic acids or ether sulfonic acids of starch or cellulose or salts of acidic sulfuric acid esters of cellulose or starch. Water-soluble polyamides containing acidic groups are also suitable for this purpose. Soluble starch preparations and other starch products than those mentioned above, for example degraded starch, aldehyde starches, etc., may also be used. Polyvinyl pyrrolidone is also suitable. However, cellulose ethers, such as carboxymethyl cellulose (sodium salt), methyl cellulose, hydroxyalkyl cellulose, and mixed ethers, such as methyl hydroxyethyl cellulose, methyl hydroxypropyl cellulose, methyl carboxymethyl cellulose and mixtures thereof, and polyvinyl pyrrolidone are also preferably used, for example in quantities of 0.1 to 5% by weight, based on the detergent. The detergents may contain derivatives of diaminostilbene disulfonic acid or alkali metal salts thereof as optical brighteners. Suitable optical brighteners are, for example, salts of 4,4'-bis-(2-anilino-4-morpholino-1,3,5-triazinyl-6-amino)-stilbene-2,2'-disulfonic acid or compounds of similar structure which contain a diethanolamino group, a methylamino group and anilino group or a 2-methoxyethylamino group instead of the morpholino group. Brighteners of the substituted diphenyl styryl type, for example alkali metal salts of 4,4'-bis-(2-sulfostyryl)-diphenyl, 4,4'-bis-(4-chloro-3-sulfostyryl)-diphenyl or 4-(4-chlorostyryl)-4'-(2-sulfostyryl)-diphenyl, may also be present. Mixtures of the brighteners mentioned may also be used. Uniformly white granules are obtained if, in addition to the usual brighteners in the usual quantities, for example between 0.1 and 0.5% by weight and preferably between 0.1 and 0.3% by weight, the compositions also contain small quantities, for example $10^{-6}$ to $10^{-3}$% by weight and preferably around $10^{-5}$% by weight, of a blue dye. A particularly preferred dye is TINOLUX® (a product of Ciba-Geigy).

Suitable soil repellents are substances which preferably contain ethylene terephthalate and/or polyethylene glycol terephthalate groups, the molar ratio of ethylene terephthalate to polyethylene glycol terephthalate being in the range from 50:50 to 90:10. The molecular weight of the linking polyethylene glycol units is more particularly in the range from 750 to 5,000, i.e. the degree of ethoxylation of the polymers containing polyethylene glycol groups may be about 15 to 100. The polymers are distinguished by an average molecular weight of about 5,000 to 200,000 and may have a block structure, but preferably have a random structure. Preferred polymers are those with molar ethylene terephthalate: polyethylene glycol terephthalate ratios of about 65:35 to about 90:10 and preferably in the range from about 70:30 to 80:20. Other preferred polymers are those which contain linking polyethylene glycol units with a molecular weight of 750 to 5,000 and preferably in the range from 1,000 to about 3,000 and which have a molecular weight of the polymer of about 10,000 to about 50,000. Examples of commercially available polymers are the products MILEASE® T (ICI) or REPELOTEX® SRP 3 (Rhonê-Poulenc).

The solid preparations may additionally contain disintegrators. Disintegrators are substances which are added to the shaped bodies to accelerate their disintegration on contact with water. Disintegrators are reviewed, for example, in J. Pharm. Sci. 61 (9172) and in R6mpp Chemielexikon, 9th Edition, Vol. 6, page 4440. Viewed macroscopically, the disintegrators may be homogeneously distributed in the shaped body although, when observed under a microscope, they form zones of increased concentration due to their production. Preferred disintegrators include polysaccharides such as, for example, natural starch and derivatives thereof (carboxymethyl starch, starch glycolates in the form of their alkali metal salts, agar agar, guar gum, pectins, etc.), celluloses and derivatives thereof (carboxymethyl cellulose, microcrystalline cellulose), polyvinyl pyrrolidone, collodion, alginic acid and alkali metal salts thereof, amorphous or even partly crystalline layered silicates (bentonites), polyurethanes, polyethylene glycols and effervescent systems. Other examples of disintegrators which may be present in accordance with the invention can be found, for example, in WO 98/40462 (Rettenmaier), WO 98/55583 and WO 98/55590 (Unilever) and WO 98/40463, DE 19709991 and DE 19710254 (Henkel). Reference is specifically made to the teaching of these documents. The shaped bodies may contain the disintegrators in quantities of 0.1 to 25% by weight, preferably in quantities of 1 to 20% by weight and more preferably in quantities of 5 to 15% by weight, based on the shaped bodies.

Suitable perfume oils or fragrances include individual fragrance compounds, for example synthetic products of the ester, ether, aldehyde, ketone, alcohol and hydrocarbon type. Fragrance compounds of the ester type are, for example, benzyl acetate, phenoxyethyl isobutyrate, p-tert.butyl cyclohexyl acetate, linalyl acetate, dimethyl benzyl carbinyl acetate, phenyl ethyl acetate, linalyl benzoate, benzyl formate, ethyl methyl phenyl glycinate, allyl cyclohexyl propionate, styrallyl propionate and benzyl salicylate. The ethers include, for example, benzyl ethyl ether; the aldehydes include, for example, the linear alkanals containing 8 to 18 carbon atoms, citral, citronellal, citronellyloxyacetaldehyde, cyclamen aldehyde, hydroxycitronellal, lilial and bourgeonal, the ketones include, for example, the ionones, α-isomethyl ionone and methyl cedryl ketone; the alcohols include anethol, citronellol, eugenol, geraniol, linalool, phenyl ethyl alcohol and terpineol and the hydrocarbons include, above all, the terpenes, such as limonene and pinene. However, mixtures of various fragrances which together produce an attractive fragrance note are preferably used. Perfume oils such as these may also contain natural fragrance mixtures obtainable from vegetable sources, for example pine, citrus, jasmine, patchouli, rose or ylang-ylang oil. Also suitable are clary oil, camomile oil, nettle oil, melissa oil, mint oil, cinnamon leaf oil, lime blossom oil, juniper berry oil, vetiver oil, olibanum oil, galbanum oil and labdanum oil and orange blossom oil, neroli oil, orange peel oil and sandalwood oil.

The fragrances may be directly incorporated in the compositions according to the invention, although it can also be of advantage to apply the fragrances to supports which strengthen the adherence of the perfume to the washing and which provide the textiles with a long-lasting fragrance through a slower release of the perfume. Suitable support materials are, for example, cyclodextrins, the cyclodextrin-lperfume complexes optionally being coated with other auxiliaries.

If desired, the final preparations may additionally contain inorganic salts, for example sodium sulfate, as fillers, preferably in quantities of 0 to 10% by weight and more preferably in quantities of 1 to 5% by weight, based on the composition.

The compositions obtainable using the new defoamer granules may be produced and used in the form of powders, extrudates, granules or agglomerates. They may be both heavy-duty and light-duty detergents or detergents for colored fabrics, optionally in the form of compactates or supercompactates. Compositions such as these may be produced by any of the corresponding processes known in the art. They are preferably produced by mixing together various particulate components containing detergent ingredients. The particulate components may be produced by spray drying, simple mixing or complex granulation processes, for example fluidized-bed granulation. In one particularly preferred embodiment, at least one surfactant-containing component is produced by fluidized-bed granulation. In another particularly preferred embodiment, aqueous preparations of the alkali metal silicate and alkali metal carbonate are sprayed in a dryer together with other detergent ingredients, drying optionally being accompanied by granulation.

The dryer into which the aqueous preparation is sprayed can be any type of dryer. In one preferred embodiment of the process, drying is carried out by spray drying in a drying tower. In this case, the aqueous preparations are exposed in known manner to a stream of drying gas in fine-particle form. Applicants describe an embodiment of spray drying using superheated steam in a number of published patents. The operating principle disclosed in those publications is hereby specifically included as part of the disclosure of the present invention. Reference is made in particular to the following publications: DE40 30 688 A1 and the further developments according to DE 42 04 035 A1; DE42 04 090 A1; DE 42 06 050 A1; DE 42 06 521 A1; DE 42 06 495 A1; DE 42 08 773 A1; DE 42 09 432 A1 and DE 42 34 376 A1.

In another preferred variant, particularly where detergents of high bulk density are to be obtained, the mixtures are subsequently subjected to a compacting step, other ingredients being added to the detergents after this compacting step. In one preferred embodiment of the invention, the ingredients are compacted in a press agglomeration process. The press agglomeration process to which the solid premix (dried basic detergent) is subjected may be carried out in various agglomerators. Press agglomeration processes are classified according to the type of agglomerator used. The four most common press agglomeration processes—which are preferred to the purposes of the invention—are extrusion, roll compacting, pelleting and tabletting, so that preferred agglomeration processes for the purposes of the present invention are extrusion, roll compacting, pelleting and tabletting processes.

One feature common to all these processes is that the premix is compacted and plasticized under pressure and the individual particles are pressed against one another with a reduction in porosity and adhere to one another. In all the processes (but with certain limitations in the case of tabletting), the tools may be heated to relatively high temperatures or may be cooled to dissipate the heat generated by shear forces.

In all the processes, one or more binders may be used as (a) compacting auxiliary(ies). However, it must be made clear at this juncture that, basically, several different binders and mixtures of various binders may also be used. A preferred embodiment of the invention is characterized by the use of a binder which is completely in the form of a melt at temperatures of only at most 130° C., preferably at most 100° C. and more preferably up to 90° C. In other words, the binder will be selected according to the process and the process conditions or, alternatively, the process conditions and, in particular, the process temperature will have to be adapted to the binder if it is desired to use a particular binder.

The actual compacting process is preferably carried out at processing temperatures which, at least in the compacting step, at least correspond to the temperature of the softening point if not to the temperature of the melting point of the binder. In one preferred embodiment of the invention, the process temperature is significantly above the melting point or above the temperature at which the binder is present as a melt. In a particularly preferred embodiment, however, the process temperature in the compacting step is no more than 20° C. above the melting temperature or the upper limit to the melting range of the binder. Although, technically, it is quite possible to adjust even higher temperatures, it has been found that a temperature difference in relation to the melting temperature or to the softening temperature of the binder of 20° C. is generally quite sufficient and even higher temperatures do not afford additional advantages. Accordingly it is particularly preferred, above all on energy grounds, to carry out the compacting step above, but as close as possible to, the melting point or rather to the upper temperature limit of the melting range of the binder. Controlling the temperature in this way has the further advantage that even heat-sensitive raw materials, for example peroxy bleaching agents, such as perborate and/or percarbonate, and also enzymes, can be processed increasingly without serious losses of active substance. The possibility of carefully controlling the temperature of the binder, particularly in the crucial compacting step, i.e. between mixing/homogenizing of the premix and shaping, enables the process to be carried out very favorably in terms of energy consumption and with no damaging effects on the heat-sensitive constituents of the premix because the premix is only briefly exposed to the relatively high temperatures. In preferred press agglomeration processes, the working tools of the press agglomerator (the screw(s) of the extruder, the roller(s) of the roll compactor and the pressure roller(s) the pellet press) have a temperature of at most 150° C., preferably of at most 100° C. and, in a particularly preferred embodiment, at most 75° C., the process temperature being 30° C. and, in a particularly preferred embodiment, at most 20° C. above the melting temperature or rather the upper temperature limit to the melting range of the binder. The heat exposure time in the compression zone of the press agglomerators is preferably at most 2 minutes and, more preferably, between 30 seconds and 1 minute.

Preferred binders which may be used either individually or in the form of mixtures with other binders are polyethylene glycols, 1,2-polypropylene glycols and modified polyethylene glycols and polypropylene glycols. The modified polyalkylene glycols include, in particular, the sulfates and/or the disulfates of polyethylene glycols or polypropylene glycols with a relative molecular weight of 600 to 12,000 and, more particularly, in the range from 1,000 to 4,000. Another group consists of mono- and/or disuccinates of polyalkylene glycols which, in turn, have relative molecular weights of 600 to 6,000 and preferably, in the range from 1,000 to 4,000. A more detailed description of the modified polyalkylene glycol ethers can be found in the disclosure of International patent application WO 93/02176. In the context of the present invention, polyethylene glycols include polymers which have been produced using $C_{3-5}$ glycols and also glycerol and mixtures thereof besides ethylene glycol as starting molecules. In addition, they also include ethoxylated derivatives, such as trimethylol propane containing 5 to 30 EO. The polyethylene glycols preferably used may have a linear or branched structure, linear polyethylene glycols being particularly preferred. Particularly preferred polyethylene glycols include those having relative molecular weights in the range from 2,000 to 12,000 and, advantageously, around 4,000. Polyethylene glycols with relative molecular weights below 3,500 and above 5,000 in particular may be used in combination with polyethylene glycols having a relative molecular weight of around 4,000. More than 50% by weight of such combinations may advantageously contain polyethylene glycols with a relative molecular weight of 3,500 to 5,000, based on the total quantity of polyethylene glycols. However, polyethylene glycols which, basically, are present as liquids at room temperature/1 bar pressure, above all polyethylene glycol with a relative molecular weight of 200, 400 and 600, may also be used as binders. However, these basically liquid polyethylene glycols should only be used in the form of a mixture with at least one other binder, this mixture again having to satisfy the requirements according to the invention, i.e. it must have a melting point or softening point at least above 45° C. Other suitable binders are low molecular weight polyvinyl pyrrolidones and derivatives thereof with relative molecular weights of up to at most 30,000. Relative molecular weight ranges of 3,000 to 30,000, for example around 10,000, are preferred. Polyvinyl pyrrolidones are preferably not used as sole binder, but in combination with other binders, more particularly in combination with polyethylene glycols.

Immediately after leaving the production unit, the compacted material preferably has temperatures of not more than 90° C., temperatures of 35 to 85° C. being particularly preferred. It has been found that exit temperatures—above all in the extrusion process—of 40 to 80° C., for example up to 70° C., are particularly advantageous.

In one preferred embodiment of the invention, the process according to the invention is carried out by extrusion as described, for example in European patent EP 0 486 592 B1 or International patent applications WO 93/02176 and WO 94/09111 or WO 98/12299. In this extrusion process, a solid premix is extruded under pressure to form a strand and, after emerging from the multiple-bore extrusion die, the strands are cut into granules of predetermined size by means of a cutting unit. The solid, homogeneous premix contains a plasticizer and/or lubricant of which the effect is to soften the premix under the pressure applied or under the effect of specific energy, so that it can be extruded. Preferred plasticizers and/or lubricants are surfactants and/or polymers. Particulars of the actual extrusion process can be found in the above-cited patents and patent applications to which reference is hereby expressly made. In one preferred embodiment of the invention, the premix is delivered, preferably continuously, to a planetary roll extruder or to a twin-screw extruder with co-rotating or contra-rotating screws, of which the barrel and the extrusion/granulation head can be heated to the predetermined extrusion temperature. Under the shear effect of the extruder screws, the premix is compacted under a pressure of preferably at least 25 bar or—with extremely high throughputs—even lower, depending on the apparatus used, plasticized, extruded in the form of fine strands through the multiple-bore extrusion die in the extruder head and, finally, size-reduced by means of a rotating cutting blade, preferably into substantially spherical or cylindrical granules. The bore diameter of the multiple-bore extrusion die and the length to which the strands are cut are adapted to the selected granule size. In this embodiment, granules are produced in a substantially uniformly predeterminable particle size, the absolute particle sizes being adaptable to the particular application envisaged. In general, particle diameters of up to at most 0.8 cm are preferred. Important embodiments provide for the production of uniform granules in the millimeter range, for example in the range from 0.5 to 5 mm and more particularly in the range from about 0.8 to 3 mm. In one important embodiment, the length-to-diameter ratio of the primary granules is in the range from about 1:1 to about 3:1. In another preferred embodiment, the still plastic primary granules are subjected to another shaping process step in which edges present on the crude extrudate are rounded off so that, ultimately, spherical or substantially spherical extrudate granules can be obtained. If desired, small quantities of drying powder, for example zeolite powder, such as zeolite NaA powder, can be used in this step. This shaping step may be carried out in commercially available spheronizing machines. It is important in this regard to ensure that only small quantities of fines are formed in this stage. According to the present invention, drying—which is described as a preferred embodiment in the prior art documents cited above—may be carried out in a subsequent step but is not absolutely essential. It may even be preferred not to carry out drying after the compacting step. Alternatively, extrusion/compression steps may also be carried out in low-pressure extruders, in a Kahl press (manufacturer: Amandus Kahl) or in a so-called Bextruder (manufacturer: Bepex). In one particularly preferred embodiment of the invention, the temperature prevailing in the transition section of the screw, the pre-distributor and the extrusion die is controlled in such a way that the melting temperature of the binder or rather the upper limit to the melting range of the binder is at least reached and preferably exceeded. The temperature exposure time in the compression section of the extruder is preferably less than 2 minutes and, more particularly, between 30 seconds and 1 minute.

The detergents according to the invention may also be produced by roll compacting. In this variant, the premix is introduced between two rollers—either smooth or provided with depressions of defined shape—and rolled under pressure between the two rollers to form a sheet-like compactate. The rollers exert a high linear pressure on the premix and may be additionally heated or cooled as required. Where smooth rollers are used, smooth untextured compactate sheets are obtained. By contrast, where textured rollers are used, correspondingly textured compactates, in which for example certain shapes can be imposed in advance on the subsequent detergent particles, can be produced. The sheet-like compactate is then broken up into smaller pieces by a chopping and size-reducing process and can thus be processed to granules which can be further refined and, more particularly, converted into a substantially spherical shape by further surface treatment processes known per se. In roll compacting, too, the temperature of the pressing tools, i.e. the rollers, is preferably at most 150° C., more preferably at most 100° C. and most preferably at most 75° C. Particularly preferred production processes based on roll compacting are carried out at temperatures 10° C. and, in particular, at most 5° C. above the melting temperature of the binder or the upper temperature limit of the melting range of the binder. The temperature exposure time in the compression section of the rollers—either smooth or provided with depressions of defined shape—is preferably at most 2 minutes and, more particularly, between 30 seconds and 1 minute.

The detergents according to the invention may also be produced by pelleting. In this process, the premix is applied to a perforated surface and is forced through the perforations and at the same time plasticized by a pressure roller. In conventional pellet presses, the premix is compacted under pressure, plasticized, forced through a perforated surface in the form of fine strands by means of a rotating roller and, finally, is size-reduced to granules by a cutting unit. The pressure roller and the perforated die may assume many different forms. For example, flat perforated plates are used, as are concave or convex ring dies through which the material is pressed by one or more pressure rollers. In perforated-plate presses, the pressure rollers may also be conical in shape. In ring die presses, the dies and pressure rollers may rotate in the same direction or in opposite directions. A press suitable for carrying out the process according to the invention is described, for example, in DE 38 16 842 A1. The ring die press disclosed in this document consists of a rotating ring die permeated by pressure bores and at least one pressure roller operatively connected to the inner surface thereof which presses the material delivered to the die space through the pressure bores into a discharge unit. The ring die and pressure roller are designed to be driven in the same direction which reduces the shear load applied to the premix and hence the increase in temperature which it undergoes. However, the pelleting process may of course also be carried out with heatable or coolable rollers to enable the premix to be adjusted to a required temperature. In pelleting, too, the temperature of the pressing tools, i.e. the pressure rollers, is preferably at most 150° C., more preferably at most 100° C. and most preferably at most 75° C. Particularly preferred production processes based on pelleting are carried out at temperatures 10° C. and, in particular, at most 5° C. above the melting temperature of the binder or the upper temperature limit of the melting range of the binder.

The production of shaped bodies, preferably those in tablet form, is generally carried out by tabletting or press agglomeration. The particulate press agglomerates obtained may either be directly used as detergents or may be aftertreated beforehand by conventional methods. Conventional aftertreatments include, for example, powdering with fine-particle detergent ingredients which, in general, produces a further increase in bulk density. However, another preferred aftertreatment is the procedure according to German patent applications DE 195 24 287 A1 and DE 195 47 457 A1, according to which dust-like or at least fine-particle ingredients (so-called fine components) are bonded to the particulate end products produced in accordance with the invention which serve as core. This results in the formation of detergents which contain these so-called fine components as an outer shell. Advantageously, this is again done by melt agglomeration. On the subject of the melt agglomeration of fine components, reference is specifically made to the disclosure of German patent applications DE-A-195 24 287 and DE-A-195 47 457. In the preferred embodiment of the invention, the solid detergents are present in tablet form, the tablets preferably having rounded corners and edges, above all in the interests of safer storage and transportation. The base of the tablets may be, for example, circular or rectangular in shape. Multilayer tablets, particularly tablets containing two or three layers which may even have different colors, are particularly preferred. Blue-white or green-white or blue-green-white tablets are particularly preferred. The tablets may also have compressed and non-compressed parts. Shaped bodies with a particularly advantageous dissolving rate are obtained if, before compression, the granular constituents contain less than 20% by weight and preferably less than 10% by weight of particles outside the 0.02 to 6 mm diameter range. A particle size distribution of 0.05 to 2.0 is preferred, a particle size distribution of 0.2 to 1.0 mm being particularly preferred.

The present invention will now be illustrated in more detail by reference to the following specific, non-limiting examples.

EXAMPLE 1

Preparation of an Intermediate Product (Support Material) with Wax-like Defoamer 10,000 kg of an aqueous slurry consisting of 0.5% by weight of cellulose ether, 5.0% by weight of sodium silicate, 20.7% by weight of sodium sulfate, 15.8% by weight of sodium carbonate, 2.0% by weight of polyacrylate/polymethacrylate, 50% by weight of water and 6% by weight of a paraffin wax mixture consisting of 30% by weight paraffin with a solidification point of 62° C. to 90° C., 30% by weight of hard paraffin with a solidification point of 42° C. to 56° C. and 30% by weight of soft paraffin with a solidification point of 35° C. to 40° C. were sprayed with continuous homogenization into a spray drying tower under a pressure of 40 bar and dried by means of hot combustion gases flowing in countercurrent (temperature in the ring channel 250° C., temperature at the tower exit 98° C.).

EXAMPLE 2

Preparation of an Intermediate Product (Support Material) with Wax-like Defoamer 10,000 kg of an aqueous slurry consisting of 0.5% by weight of cellulose ether, 2.0% by weight of sodium silicate, 13% by weight of sodium sulfate, 23.5% by weight of zeolite, 2.0% by weight of polyacrylate/polymethacrylate, 50% by weight of water, 7% by weight of paraffin with a solidification point of 62° C. to 90° C. and 2% by weight of bis-stearyl ethylenediamide were sprayed with continuous homogenization into a spray drying tower under a pressure of 40 bar and dried by means of hot combustion gases flowing in countercurrent (temperature in the ring channel 250° C., temperature at the tower exit 98° C.).

EXAMPLE 3

Preparation of an Aqueous Silicone Emulsion 2000 kg of an aqueous solution containing 3.7% by weight of a thickener mixture of sodium carboxymethyl cellulose and methyl cellulose in a ratio by weight of 70:30 were allowed to swell for 4 hours at 25° C. 20% by weight of a polysiloxane defoamer (polydimethyl siloxane with microfine silanized silica) were added to the resulting solution. A stable aqueous emulsion was obtained.

EXAMPLE 4

Preparation of an Aqueous Silicone Emulsion 2000 kg of an aqueous solution containing 3.7% by weight of a thickener mixture of sodium carboxymethyl cellulose and methyl cellulose in a ratio by weight of 70:30 were allowed to swell for 4 hours at 25° C. 30% by weight of corn starch and 20% by weight of a polysiloxane defoamer (polydimethyl siloxane with microfine silanized silica) were added to the resulting solution. A stable aqueous emulsion was obtained.

EXAMPLE 5

Fluidized Bed Granulation 650 kg/h of the powder-form intermediate product prepared in accordance with Example 1 were continuously introduced through a solids metering system into a fluidized bed granulator (SKET granulator) comprising a circular diffusor plate through which drying air with a temperature of 140° C. flowed at a rate of around 20,000 $m^3$ air/h. 350 kg/h of the aqueous silicone emulsion prepared in accordance with Example 3 were sprayed continuously onto the powder-form intermediate product. The temperature in the fluidized bed above the diffusor plate was 85° C. while the temperature of the exhaust air was 79° C. Granules with the following composition were obtained: 7% by weight silicone, 2.2% by weight cellulose ether, 9.2% by weight sodium silicate, 38.0% by weight sodium sulfate, 29.1% by weight sodium carbonate, 3.7% by weight polyacryl/methacrylate and 11.0% by weight of a paraffin wax mixture consisting of 30% paraffin with a solidification point of 62° C. to 90° C., 30% by weight hard paraffin with a solidification point of 42° C. to 56° C. and 30% by weight soft paraffin with a solidification point of 35° C. to 40° C. The granules had a bulk density of 810 g/l and a particle size distribution in which 95% by weight of the particles were below 1.5 mm in diameter. The product had very good flow properties and contained hardly any dust.

EXAMPLE 6

Fluidized Bed Granulation

Following the procedure of Example 5, 650 kg/h of the powder-form intermediate product prepared in accordance with Example 2 were continuously introduced through a solids metering system into the fluidized bed granulator (SKET granulator) at a rate of flow of the drying air (temperature 100° C.) of around 20,000 $m^3$ air/h. 350 kg/h of the aqueous silicone emulsion prepared in accordance with Example 4 were continuously sprayed onto the powder-form intermediate product. The temperature in the fluidized bed above the diffusor plate was 65° C. while the temperature of the exhaust air was 60° C. The granules obtained had the following composition: 7% by weight silicone, 10.3% by weight starch, 2.1% by weight cellulose ether, 3.2% by weight sodium silicate, 21.2% by weight sodium sulfate, 38.1% by weight zeolite, 3.3% by weight polyacryl/methacrylate, 11.5% by weight paraffin and 3.3% by weight bis-stearyl ethylenediamide. The granules had a bulk density of 780 g/l and a particle size distribution in which 95% by weight of the particles were below 1.5 mm in diameter. The product had very good flow properties and contained no dust.

Performance Tests

The defoamer granules produced were incorporated by simple mixing in a quantity of 1.5% by weight in a powder-form heavy-duty detergent formulation containing 8% by weight sodium alkyl benzenesulfonate, 10% by weight alkyl ethoxylate, 1.5% by weight soap, 10% by weight sodium carbonate, 20% by weight zeolite, 3% by weight sodium silicate, 20% by weight sodium perborate, 2% by weight tetraacetyl ethylenediamine (TAED), 0.5% by weight protease, balance to 100% by weight sodium sulfate and water. The detergents obtained showed satisfactory foaming behavior both at 30° C. and at 40° C., 60° C. and 95° C.

What is claimed is:

1. A process for producing defoamer granules, said process comprising:

(a) providing a support material;

(b) applying an aqueous emulsion comprising a silicone to the support material to form a silicone/support material product; and (c) simultaneously drying and granulating the-product in a fluidized bed granulator to provide a defoamer granule composition, such that the composition contains at least 85% by weight of particles having a mean diameter less than 1.5 mm.

2. The process according to claim 1, wherein the product is simultaneously dried and granulated to provide the defoamer granule composition, such that the composition contains at least 90% by weight of particles having a mean diameter less than 1.5 mm.

3. The process according to claim 1, wherein the product is simultaneously dried and granulated to provide the defoamer granule composition, such that the composition contains at leas 95% by weight of particles having a mean diameter less than 1.5 mm.

4. The process according to claim 1, wherein the support material comprises a wax-like defoamer.

5. The process according to claim 4, wherein the wax-like defoamer is present in an amount of from about 2% to about 80% by weight based on the total weight of the support material.

6. The process according to claim 5, wherein the wax-like defoamer comprises at least one compound selected from the group consisting of bisamides, fatty acids, fatty alcohols, carboxylic acid esters and paraffin waxes.

7. The process according to claim 1, wherein the support material comprises at least one compound selected from the group consisting of alkali metal carbonates, alkali metal sulfates, alkali metal phosphates, zeolites, alkali metal silicates, cellulose ethers, polycarboxylates and starches.

8. The process according to claim 7, wherein the support material further comprises a wax-like defoamer.

9. The process according to claim 8, wherein the wax-like defoamer comprises at least one compound selected from the group consisting of bisamides, fatty acids, fatty alcohols, carboxylic acid esters and paraffin waxes.

10. The process according to claim 8, wherein applying the aqueous emulsion comprises continuously spraying the emulsion onto the support material.

11. The process according to claim 8, wherein the silicone comprises a polydisiloxane.

12. The process according to claim 1, wherein applying the aqueous emulsion comprises continuously spraying the emulsion onto the support material.

13. The process according to claim 1, wherein the simultaneous drying and granulating is performed above a circular diffusor plate having at least one opening for throughflow of drying air.

14. The process according to claim 1, wherein the silicone comprises a polydisiloxane.

15. The process according to claim 1, wherein the aqueous emulsion further comprises a thickener.

16. The process according to claim 15, wherein the thickener is present in an amount of from about 0.5 to about 10% by weight, based on the total weight of the aqueous emulsion.

17. The process according to claim 15, wherein the aqueous emulsion further comprises a natural source starch, wherein the starch is present in an amount of from about 0.1% to about 50% by weight, based on the total weight of the aqueous emulsion.

18. The process according to claim 15, wherein the thickener comprises sodium carboxymethyl cellulose and a nonionic cellulose ether.

19. The process according to claim 18, wherein the sodium carboxymethyl cellulose and the nonionic cellulose ether are present in a ratio by weight of from about 80:20 to about 40:60.

20. The process according to claim 1, wherein the silicone is present in an amount of from about 5% to about 50% by weight, based on the total weight of the aqueous emulsion.

21. The process according to claim 1, wherein the silicone is present in an amount of from about 20% to about 40% by weight, based on the total weight of the aqueous emulsion.

22. A defoamer composition comprising granules prepared by the process according to claim 1.

23. A process for producing defoamer granules, said process comprising:

(a) providing a support material comprising (i) at least one compound selected from the group consisting of alkali metal carbonates, alkali metal sulfates, alkali metal phosphates, zeolites, alkali metal silicates, cellulose ethers, polycarboxylates and starches, and (ii) a wax-like defoamer selected from the group consisting of bisamides, fatty acids, fatty alcohols, carboxylic acid esters, paraffin waxes and mixtures thereof, wherein the wax-like defoamer is present in an amount of from about 2% to about 80% by weight, based on the total weight of the support material;

(b) continuously spraying an aqueous emulsion comprising a polydisiloxane and a thickener onto the support material to form a silicone/support material product, wherein the thickener comprises sodium carboxymethyl cellulose and a nonionic cellulose ether in a ratio by weight of from about 80:20 to about 40:60, the thickener being present in an amount of from about 0.5 to about 10% by weight, based on the total weight of the aqueous emulsion; and (c) simultaneously drying and granulating the product in a fluidized bed granulator to provide a defoamer granule composition, such that the composition contains at least 85% by weight of particles having a mean diameter less than 1.5 mm.

24. A defoamer composition comprising granules prepared by the process according to claim 23.

* * * * *